(12) United States Patent
McCurdy et al.

(10) Patent No.: US 6,661,885 B1
(45) Date of Patent: Dec. 9, 2003

(54) SYSTEM AND METHOD FOR UPDATING TRUNK GROUP TRANSLATIONS

(75) Inventors: Richard H. McCurdy, Birmingham, AL (US); Sheila K. Moon, Trussville, AL (US); Deborah Baumgardner, Peachtree City, GA (US); James Pugh, Morris, AL (US); Diane C. Stone, Stone Mountain, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/472,041

(22) Filed: Dec. 27, 1999

(51) Int. Cl.[7] ................................................. H04M 3/42
(52) U.S. Cl. .............................. 379/201.12; 379/15.03; 379/240
(58) Field of Search .................... 379/15.03, 201.12, 379/221.02, 240, 333

(56) References Cited

U.S. PATENT DOCUMENTS

| | | | |
|---|---|---|---|
| 4,669,113 A | * 5/1987 | Ash et al. | 379/221.01 |
| 6,002,502 A | * 12/1999 | Pomp et al. | 398/45 |
| 6,349,093 B1 | * 2/2002 | Caldwell et al. | 370/259 |
| 6,466,973 B2 | * 10/2002 | Jaffe | 709/223 |

* cited by examiner

Primary Examiner—Ahmad F. Matar
Assistant Examiner—Karen Le
(74) Attorney, Agent, or Firm—Shaw Pittman LLP

(57) ABSTRACT

A translation file containing trunk group, trunk level and other translation data is created on a translation input system in response to a circuit provisioning request. An interface between the translation input system and a trunk inventory system transfers the translation file to a translation file directory on a server. The interface logs into the trunk inventory system to generate a translation document to be used by switch technicians to translate trunk groups. Generic views are used rather than conventional structured views to simplify the generation of the translations document. The generic views also reduce the complexity of the software required to implement the interface.

18 Claims, 8 Drawing Sheets

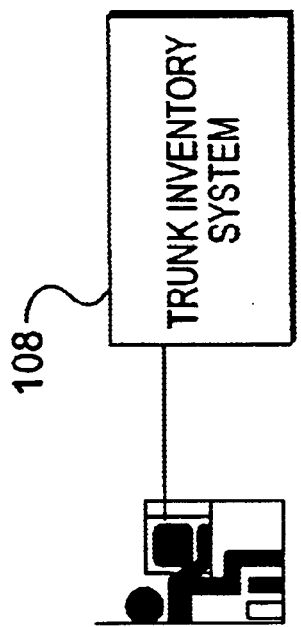
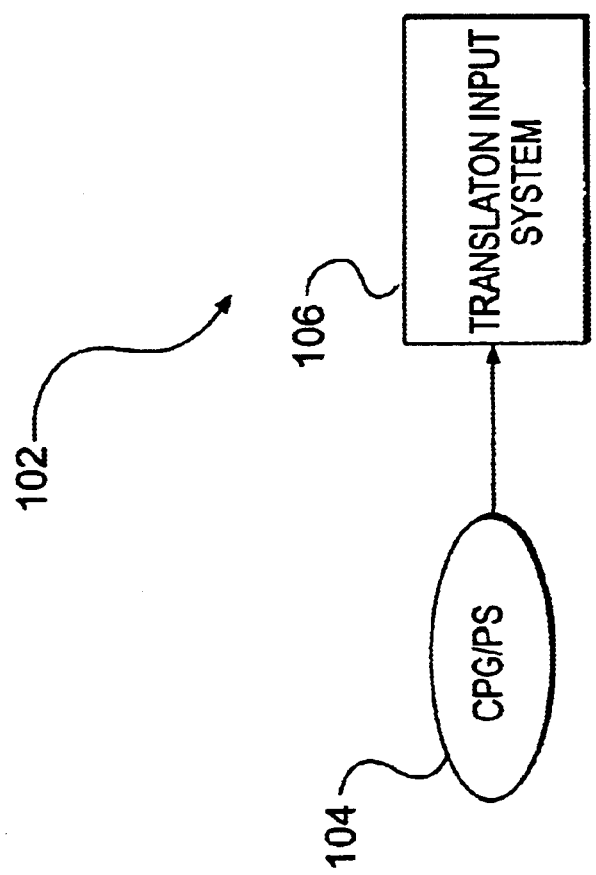
FIG. 1

```
COMMAND            5EC LTOLLCON TRUNK GROUP RECORD  /FOR                         PAGE 01:
CKT M DF55IEZICE  /BILXMSEDDS0/7-/BILMADS0 A BILXMSEDD0 Z BILXMSMADS0
CLO          ACTION IE DUE DATE      END Z VIEW LTOLLCON GAC AF156089
KEY AF156089                    TYPE G TRK LAST UPDT 032699 175900.4
                 FORM: 5202 (5.1)
|---TRK HUNT------GLARE          FREE INC TND AT TERA    CALLMON¬
TGN DIR TYPE  SCR ACTION DAS TRKCLS ANS    WINK TTN RCVY IAPT    INH
0221

IN  OUT       HOLD FAR END LOCAL
INSEP PULSING PULSING SATELLITE BUSY    NPA SM BRCS      TRUNK CHAR

DATA   DIR CON       RTE NBR         FGD CIC
FEND CLLI    REMARKS RATE      DN          PLAN         BILLING DN SZ

SPEECH QUEUE ENQUEUEQUEUE  TRIG    UNRES  ASP LRN CNA AML AML
TRMTS ALLOWED ACT   FEATURE NBR    EA TOLL    DAS OPTION PERCENT ALARM

GTS00011 FIND SUCCESSFUL
                                                GDJ
```

FIG. 2a

```
COMMAND            SEC LTOLLCON TRUNK GROUP RECORD   /FOR              PAGE 02:
CKT M DF55IEZICE   /BILXMSEDDS0/7-/BILMADS0 A BILXMSEDDS0 Z BILXMSMADS0
CLO        ACTION IE DUE DATE    END Z VIEW LTOLLCON GAC AF156089
KEY AF156089               TYPE G TRK LAST UPDT 032699 175900.4
|-----FORM: 5204 (5.5)-----------------------------------------------|
TRANS IDLE   IN START OUT START LEAST           IDLE ANI
CLASS SUPV STATE DIAL       DIAL      DIAL
  1
```

FUTURE                    CAROT
                           MOD

FIG. 2b

GTS0001IPAGE SUCCESSFUL
GD]

[HEADER]
SEQ=1/1
ERRNUM=1
ERRMSG=SUCCESS
TYPCODE=ADD
CILLI=BILXMSMADS0
TGN=0221
TGSN=AF156089
OFCTYP=5EL
SERVICE=IEZICE
FAROFCTYP=DMH
GRPVIEW=N34
TRKVIEW=TRKCCS
START TMN=1
NUMTOC=1
TOC=DIGITAL
TCC=01
TRKDIR=INC
ADMINAREA=MS
NUMCLOS=1
CLO=MSM072336,12/31/99,48

[GROUPINFO]
TABLE=5202
TGN=0221
TRK DIR=INC
SCR=NISC/CTG
DAS=NISC/CTG
TRKCLS=LTOLLCON
FREE ANS=N
INC TND WINK=N
IAPT=Y
CALLMON INH=Y
INSEP=10
INPULSING=ISUP7
SATELLITE=N
HOLD BUSY=N
FAR END NPA=228
BRCS=N
TRUNK CHAR=DFLEZICECCINC
FEND CLLI=BILXMSEDDS0
REMARKS=AF156089 INC
DATA RATE=56K
SPEECH TRMTS=N
TRUNK QUERY=Y
XLT TEST=Y
NEND CLLI=BILXMSM
VPA RATE=12
VPA TYPE=4W4WLO
DEST PT CODE=252149001
ORIG PT CODE=252149003
CCS7 TYPE=BELLCORE
ISUP MLD=

[TRUNKINFO]
TRANS CLASS=01
SUPV=
IDLE STATE=ON
IN START DIAL=NONE
BRCS=N

```
COMMAND                5EC N34 GROUP RECORD         /FOR                        PAGE 01
CKT M DF55IEZICE /BILXMSEDDS0/7-/BILXMSMADS0 A BILXMSEDDS0 Z BILXMXMADS0
CLO              ACTION IE DUE DATE       END Z VIEW N34       GAC AF156089
KEY AF156089                TYPE G TRK   LAST UPDT 032699 175900.4
|------GROUP LEVEL DATA 1-----| |-----GROUP LEVEL DATA 2------|
TABLE=5202                       FEND CLLI=BILXMSEDDS0
TGN=0221                         REMARKS=AF156089 INC
TRK DIR=INC                      DATA RATE=56K
SCR=NISC/CTG                     SPEECH TRMTS=N
DAS=NISC/CTG                     TRUNK QUERY=Y
TRKCLS=LTOLLCON                  XLT TEST=Y
FREE ANS=N                       NEND CLLI=BILXMSMADS0
INC TND WINK=N                   VPA RATE=12
IAPT=Y                           VPA TYPE=4W4WL0
CALLMON INH=Y                    DEST PT CODE=252149001
INSEP=10                         ORIG PT CODE=252149003
INPULSING=ISUP7                  CCS7 TYPE=BELLCORE
SATELLITE=N                      ISUP MLD=N
HOLD BUSY=N
FAR END NPA=228
BRCS=N
TRUNK CHAR=DFIEZICECCINC                                                     GD]

GTS0001I END SUCCESSFUL
```

FIG. 4a

```
COMMAND                5EC N34 GROUP RECORD           /FOR                PAGE 03
CKT M DF55IEZICE /BILXMSEDDS0/7-/BILXMSMADS0 A BILXMSEDDS0 Z BILXMXMADS0
CLO              ACTION IE DUE DATE    END Z VIEW N34   GAC AF156089
KEY AF156089                  TYPE G TRK    LAST UPDT 032699 175900.4
|------TRUNK LEVEL DATA-------|
TRANS CLASS
SUPV
IDLE STATE
IN START DIAL
OUT START DIAL
BRCS
LEAST IDLE
MUSIC SOURCE
MAXCALLS
EXTGUARDTIMING
ANSWERDELAYTIMING
NO EXSIG
MFLOSS
ANI
CAROT MOD
TGN                0221                                            GD]

GTS000II PAGE SUCCESSFUL
```

FIG. 4b

SYSTEM AND METHOD FOR UPDATING TRUNK GROUP TRANSLATIONS

BACKGROUND

1. Field of Invention

The present invention relates generally to the field of generating trunk group translations for new telephone services. More specifically, the present invention relates to the field of interfacing between an translations input system and a trunk inventory system.

2. Background of the Invention

Telephone companies must assign trunks and facilities to support new services, such as a new trunk-terminated service for a telephone service subscriber or a new telephone company trunk group. The process of assigning the trunks and facilities, known as "circuit provisioning," is performed by establishing new trunk groups and trunks in the telephone company's network over which the service is implemented. During circuit provisioning, translations for the switch are entered into the software of the central office switch by a switch technician.

Translations consist of information that is input in a switch to operate correctly to provide new service including, for example, trunk group number, group type, direction, trunk selection, glare control, and type of pulsing. Essentially, the translations are software data elements that "translate" human service requirements into logic the switching machine can recognize and use. The translations include trunk group level data and trunk level data. Trunk level data relates to the individual port assignments of the switch for which the circuit provisioning is being performed. Trunk group data defines the characteristics for each of the trunks being provisioned. Additional information required for routing and screening is obtained from other sources.

Translation information is vendor specific and can differ depending on the type of trunk group being translated within a particular environment. In the prior art, when a new trunk group was ordered, the provisioning specialist would have to work his way through the switch vendor's translation guides to determine data values that would ultimately be used to manually populate translation screens in a trunk inventory system.

The translations guides are complex documents published by the telephone network vendors, e.g., the Lucent 5ESS Translation Guide and the Nortel Practice 297-8021-350 guide, both of which are incorporated by reference in their entireties herein. The translation guides contain numerous volumes of documentation the provisioning specialist needs to provision new trunk groups. Using the translation guides, along with his experience, the provisioning specialist attempts to determine the fields that needed to be populated to translate the type trunk group being translated, and fill in the values for those fields. From this input, a document would be generated having the fields and their values. This document was issued to the switch technician who entered the data in the switch.

As might be expected, this process for providing trunk group translations resulted in many errors. For example, the provisioning specialist might choose an inaccurate value for a field because of the complexity of the translation guides. In addition, the provisioning specialist could enter the data incorrectly into the trunk inventory system.

To assist the provisioning specialist in determining the correct information for a new trunk group, a system was developed that organized the data from the translation guides into logic tables. This system is a translation input system. One such translation input system is the NeTTS system operated by BellSouth Telecommunications, Inc. of Atlanta, Ga. The provisioning specialist interacts with the translations input system to input trunk group level data and trunk group data. As described above, this data includes of trunk group serial number, trunk group number, direction, pulsing, start dials, traffic use code/service code, circuit order number, and due date. For customer-ordered trunk groups, the translation input system might query the provisioning specialist to assist the provisioning specialist in generating the translation for the trunk group being translated. The NeTTS system made the process of input translations data faster and more accurate.

NeTTS generates a file containing switch specific data fields and data values required for the trunk group translation. The information contained in the file is entered into a trunk inventory system using one or more switch-specific views. The provisioning specialist determines the correct switch-specific view to use with the aide of a job aide. Each view is a switch-specific screen presented to the provisioning specialist that contains the fields that have to be populated for a particular trunk group translation for a particular switch. One example of a system providing such views is the Generic Trunk Administration System (GTAS) executing on the trunk inventory record keeping system (TIRKS) at BellSouth in Atlanta, Ga. TIRKS is an exemplary trunk inventory system that was developed by Bellcore (now Telcordia Technologies). It is a database that contains information related to trunk groups, equipment, and facilities in the telephone network.

The provisioning specialist updates the relevant views to create the trunk group translation. This is a slow, laborious process that not only requires additional manpower, but is also prone to human error. The trunk inventory system outputs a document to a switch technician that contains the trunk group level translations and trunk level translations that the switch needs to create a new trunk group.

FIG. 1 is a schematic diagram illustrating a prior art system having a manual interface between NeTTS and TIRKS. Referring to FIG. 1, a system 102 has a circuit provisioning group ("CPG") 104 in which there is a provisioning specialist. The provisioning specialist receives a request or work order to provide trunk group and trunk group level translations. The provisioning specialist interfaces with a translation input system 106, such as NeTTS (described above), enters trunk group translation data into translation input system 106 by populating an input screen and answering questions, if necessary. Translations input system 106 uses the data provided by the provisioning specialist and logic tables administered by the local telephone company to generate a file containing trunk group translation data, which the provisioning specialist prints out as a document.

Using a switch specific view job aid, the provisioning specialist determines the trunk group view name and trunk view name to be used for the trunk group being translated. The provisioning specialist logs into trunk inventory system 108 and traverses through the various views to create the required trunk group translation.

For example, using the GTAS system described above, the provisioning specialist populates a TAS administrative screen with the view names from the job aid. The provisioning specialist then updates a TAS trunk group number screen with the trunk group number, start member number and end trunk number. Then, using the document printed from translation input system 106, the provisioning specialist populates the trunk group and trunk group level translation data on the TASASG hard-coded screen using the printout from NeTTS.

An exemplary conventional two-page GTAS view is illustrated in FIGS. 2A (page 1) and 2B (page 2). As shown, the view has a number of hard-coded fields distributed throughout the document. The specific field names and functions are well-known to those skilled in the art and described in the various the switch vendor translations guides referenced above. There are different view names depending on switch type and type of group being translated.

As can be seen, the view illustrated in FIGS. 2A and 2B has a hard-coded or specific structured format. The provisioning specialist inputs data in the various fields provided in the view. Every field in the particular view is present, whether the field is populated or not.

Local telephone companies have the ability to design customized trunk group and trunk level translation views that are based on switch type and group types. Consequently, there are hundreds of views for typical telephone company trunk groups. In addition, the views are hard-coded, i.e., the views have a very specific structure that cannot be easily modified. That is, every field, whether populated or not for the view is displayed on the screen, and at specific points in the screen. This holds true for the paper document that is generated as the output of the trunk inventory system that is ultimately provided to the switch technician to enter the trunk group translation. Thus, any interface contemplated between translation input system 106 and trunk inventory system 108 using conventional views would have to be able to handle the hundreds of switch-specific views that exist, as well as be able to adapt with changing views. Such an interface would be an enormously difficult undertaking, not only due to the large number of switch-specific views, but also in providing a system for easily modifying and incorporating modified views.

SUMMARY OF THE INVENTION

The present invention solves the problems associated with conventional translation generation systems by providing a direct interface between a translation input system, such as NeTTS, and a trunk inventory system such as TIRKS. Thus, the present invention sets up a link between the mechanized trunk group translation output system and the input trunk inventory system. Using the present invention, a provisioning specialist translates a new trunk group using a translation input system. The translation input system generates a file including a header section, a trunk group section, and a trunk level section. The header section includes the trunk group number, trunk and group view names, start trunk number, start member number, and end trunk number. The trunk group and trunk level sections include the switch-specific translations data required for the trunk group being translated.

Using an approved file transfer protocol, the file is sent to an input translation file directory residing on a server. The input translation file directories is scanned periodically to determine if any new translation files have been added. When a new file is found, it is processed by a terminal emulation program such as TASKMATE. The terminal emulation program logs into the trunk inventory system and, using the new file received from the translation input system, performs all trunk group and trunk group level updates to generate the trunk group translation.

In the preferred embodiment of the present invention, the trunk group and trunk level updates are performed using "generic" views provided on the trunk inventory system. Thus, the file output by the NeTTS system is reformatted into a generic view. This reformatting is preferably done by a terminal emulation program such as the well-known TASKMATE terminal emulator.

Generic views are free-formatted views. That is, generic views do not have the rigid structure of conventional views. For example, in the preferred embodiment, the generic views have only a header and space to place the trunk group level translation data. Free-formatted views simplify creating the interface between the translation input system and the trunk inventory system by eliminating the need to design software for each switch-specific view. Moreover, using the free-formatted views of the present invention eliminates the need to continuously update the terminal emulation program when changes are made to views because the only software needs only to handle a generic view, as opposed to a switch-specific view. The generic views allow terminal emulation software to use the file output by the translation input system to populate the table name, translation fields, and field values on blank lines, without requiring adherence to any rigid structure.

Thus, one object of the present invention is to provide an interface between a translation input system, such as NeTTS, and a trunk inventory system, such as TIRKS, using an approved file transfer protocol and a terminal emulation program such as TASKMATE.

Another object of the present invention is to provide generic views for use in generating trunk group translations.

Another object of the present invention is to improve the accuracy of entering translation information into a trunk inventory system.

Another object of the present invention is to improve the efficiency of entering trunk group translation information into a trunk inventory system.

Another object of the present invention is to improve the speed of entering trunk group translation information into a trunk inventory system.

Another object of the present invention is to avoid synchronization problems that can arise if structured views change before the terminal emulation program can be updated to handle the new view.

These and other objects of the present invention are described in greater detail in the detailed description of the invention, the appended drawings, and the attached claims.

BRIEF DESCRIPTION OF THE DRAWINGS

FIG. 1 is a schematic diagram illustrating a prior art system showing the manual interface between a translation input system and a trunk inventory system in conventional systems.

FIGS. 2A and 2B illustrate an exemplary prior art structured view.

FIG. 3A shows an exemplary translation file.

FIGS. 4A and 4B illustrate an exemplary generic view according to a preferred embodiment of the present invention.

DETAILED DESCRIPTION OF THE PREFERRED EMBODIMENTS

Figure 3:
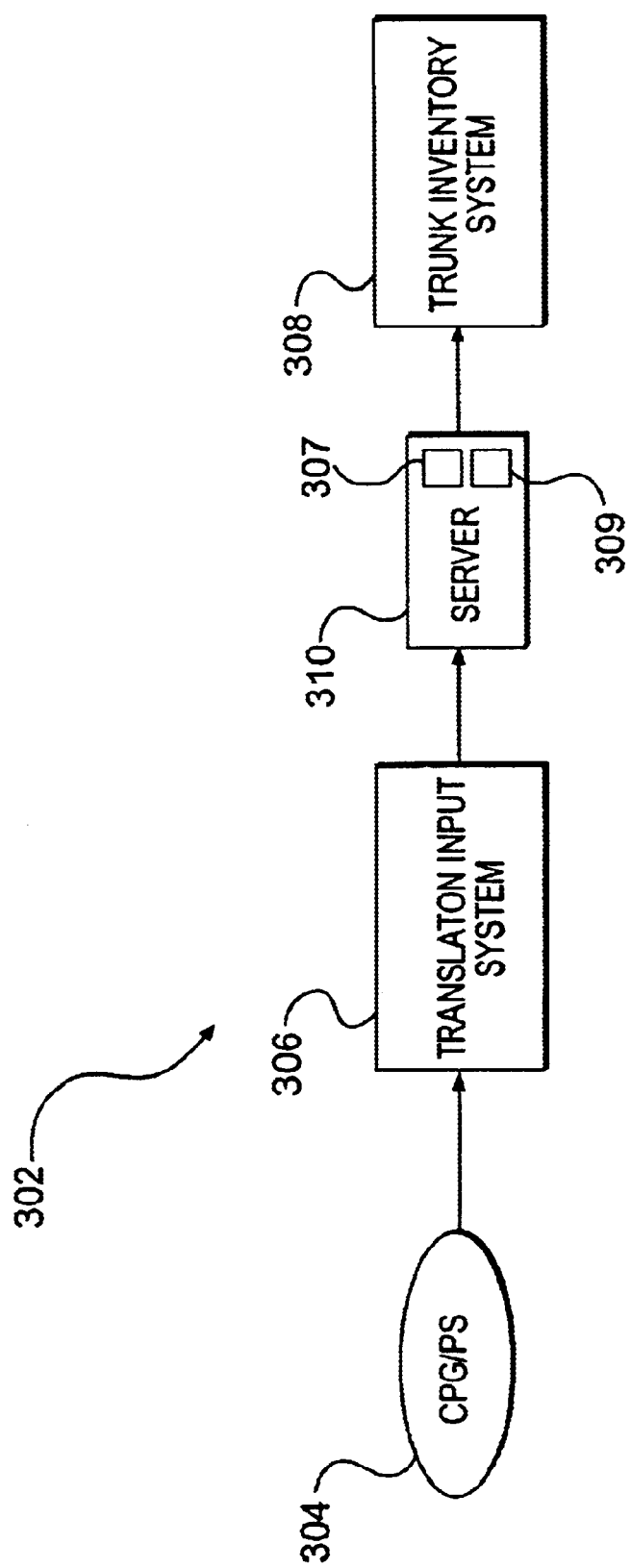
FIG. 3 is a schematic diagram illustrating the interface between a translation input system and a trunk inventory system according to a preferred embodiment of the present invention.

FIG. 3 is a schematic diagram illustrating a system 302 according to a preferred embodiment of the present invention. System 302 has a circuit provisioning group ("CPG") 304 in which a provisioning specialist receives a request or work order to provide new trunk group translations. The provisioning specialist interfaces with a translation input system 306, such as NeTTS (described above), by inputting translation-related data. In some cases, the provisioning specialist can be aided in performing this data-entry phase by being led through a series of questions designed to extract information required to create a translation file. Although NeTTS is the preferred translation input system 306, it would be apparent to those skilled in the art that any translation input system can be used.

Translation input system 306 applies the information provided by the provisioning specialist to its translation logic tables to generate a translation file. An exemplary translation file 320 is shown in FIG. 3A.

The translation file is transferred to a server 310 where it is stored in a translation file directory 307. Server 310 also has a terminal emulation program 309 executing on it. Using a terminal emulation program, the translation file is retrieved from the server and used to populate a generic view in the trunk inventory system. Thus, the present invention eliminates the need to generate a paper document to be used by the circuit provisioning specialist to generate a trunk group translation in the trunk inventory system, as well as the need for the provisioning specialist to manually re-enter the information contained in the translation file. Therefore, the potential for human error is eliminated. In addition, because the file transfer is electronic, the present invention enjoys a significant speed increase over conventional systems. Preferably, trunk inventory system 308 is the well-known TIRKS system, described above, though it would be apparent to those skilled in the art that any trunk inventory system can be used.

The translation file contains a header. Preferably, the header includes such information as trunk group serial number, end of trunk circuit, trunk group number, starting member number, ending trunk number, group view name, and trunk view name, error codes and a code that indicates whether the file is a retransmittal. For example, the header of translation file 320 indicates that an "N34" view should be used. The translation file is reformatted by terminal emulator 309 for entry on a generic view in trunk inventory system 308. The two-page generic view is represented in FIGS. 4A (page 1) and 4B (page 2).

Preferably, the translation file is transferred from translation input system 306 to trunk inventory system 308 using the well-known file transfer protocol ("FTP"). In the preferred embodiment, server 310 is a UNIX server and terminal emulator 309 is the well-known TASKMATE terminal emulator. In addition, in the preferred embodiment, server 310 has a UNIX CRON process executing on it. The UNIX CRON process periodically checks translation file directory 307 for the presence of new translation files. The preferred period is 15 minutes. A UNIX CRON process is a watchdog process which periodically performs a pre-determined operation. Each new file found in translation file directory 307 is processed by a terminal emulation program 309. Terminal emulator 309 logs into trunk inventory system 308. Using a found translation file, terminal emulation program 309 traverses a series of input screens (GTAS screens in the preferred embodiment) to perform trunk group and trunk group level updates to translate a trunk group to generate a generic view having the required translation information. The generic view is then distributed to a switch technician to enter the trunk group translation into the switch to support the new service requested in the provisioning request. Thus, after trunk inventory system 308 receives the required trunk group translation data, it is used to provide overall provisioning documents to field personnel responsible for activating the requested service. In the preferred embodiment, the GTAS screens that are traversed include TGNSUM (trunk group number summary screen), TASADM (TAS administrative screen), TASTGN (TAS trunk group number screen) and TASASG (TAS assignment screen).

In the preferred embodiment, terminal emulator 309 first accesses the TGNSUM screen in GTAS and performs a find using the trunk group serial number, trunk group number, and end of circuit provided in the translation file header. While in the TGNSUM screen, terminal emulator 309 unrestricts any trunk group corresponding to the trunk group number and serial number so that it can be used.

Terminal emulator 309 then accesses the TASADM screen and performs a find using the trunk group serial number, and end of circuit as provided in the translation file header. Terminal emulator 309 then populates the group view name and trunk view name using the information provided in the translation file header.

Terminal emulator 309 then accesses the TASTGN screen and performs a find using the trunk group serial number, and end of circuit provided in the translation file header. Terminal emulator then populates the trunk group number, the start trunk number obtained from the TGMS screen in TIRKS, start member number and end trunk number using the information provided in the translation file header.

Finally, terminal emulator 309 accesses the TASASG screen and performs a find using the trunk group serial number, and end of circuit provided in the translation file header. Terminal emulator 309 populates the data from a GROUPINFO section of the translation file on sequential blank lines of the generic view. That is, the first GROUPINFO data item is placed on the first blank line of the generic view. Each succeeding GROUPINFO data item is placed in the next blank line following the last place GROUPINFO data item. Terminal emulator 309 then goes to the second page of the generic view to populate the generic view section corresponding to a TRUNKINFO section of the translation file. Though the section of the generic file that is populated with the TRUNKINFO data could be populated in free form, i.e., line-by line as described with respect to the GROUPINFO data, this is not done in the preferred embodiment because the data in this section is generally static. This results from the way that the trunk inventory system used in the preferred embodiment of the present invention, TIRKS, is structured. In TIRKS, the same internal item names are used at both the group level and the trunk level. Thus, information populated at the group level is promulgated down to each individual trunk. It would be apparent to those skilled in the art that if a trunk inventory system other than TIRKS is used that is not structured as described above, the free format used for the GROUPINFO data might be applicable to the TRUNKINFO data as well.

A generic view corresponding to the formatted view of FIGS. 2A and 2B is illustrated in FIGS. 4A (page 1) and 4B (page 2). An explanation for each of the fields contained therein is provided by the vendor's translation guides incorporated above by reference herein in their entireties.

Because terminal emulator 309 populates a generic view by simply appending the next data item in the translation file on the next blank line of the generic view, terminal emulator 309 does not have to search for the appropriate field in which to place the appropriate data, as was the case using the structured-formatted views of conventional systems. This eliminates the requirement that terminal emulator 309 have subroutines written for each and every view that it might encounter; it need only be able to handle a small number of generic views. Moreover, this eliminates the synchronization problem associated with changing views because there is no fixed structure to which to adhere. Thus, changes can be made to the views without wreaking havoc on terminal emulator 309.

In the preferred embodiment of the present invention, there are 9 generic views in the preferred embodiment of the present invention: N34, N68, N102, NIPHZ, NSL, NX75, N68TOPS, N68X75 and NPBX. These are listed in Table 1 along with the switch-types with which they are used. Thus, the present invention requires management of only a few generic views, rather than the dozens or hundreds of views having specific formats that have to be managed in conventional systems. In the extreme case only one view is required per switch type. However, for reasons described below, more than one view is preferable. It would be apparent to those skilled in the art that as old switches are redesigned or new switches are developed, new generic views may have to be defined.

TABLE 1

Views used in the preferred embodiment

| Switch | 1ES | 5ES | DMS100/200 | DMS10 | SIE-MENS | SCC |
|---|---|---|---|---|---|---|
| Generic Views | N34 N68 N102 | N34 N68 N102 NX75 | N34 N68 N102 N68TOPS N68X75 | N34 N68 | N34 N68 NIPHZ NX75 | N34 N68 NSL NPBX |

The generic views are preferably selected and named based on the number of translation fields required. In the preferred embodiment, the names correspond to the number of pages required to capture the data from NeTTS. For example, the N34 view is only a two-page document. An N68 view requires three pages of data. This eases programming requirements because the programmer can determine whether he or she needs to page forward to another page, based on the name of the view. In addition, wasteful sending of blank pages to a switch technician is avoided. Thus, while it would be possible to use only one generic view for all switches, this would often result in the production of blank pages. For example, an N102 could be used to capture the data illustrated in the two-page view illustrated in FIGS. 4A and 4B. However, because the N102 view is a four-page view, it would send blank pages to the field.

The view names also indicate how many fields can be included in the view. For example, in the N34 view, 0 to 34 fields can be included. Zero to 68 fields can be included in the N68 field, though preferably 35–68 fields are included (an N34 view is preferable if 34 or fewer fields are sent, to prevent blank pages). The 34, 68 and 102 field limits are a function of the TIRKS system. It would be apparent to those skilled in the art that other limits can be chosen and used.

Figure 5:
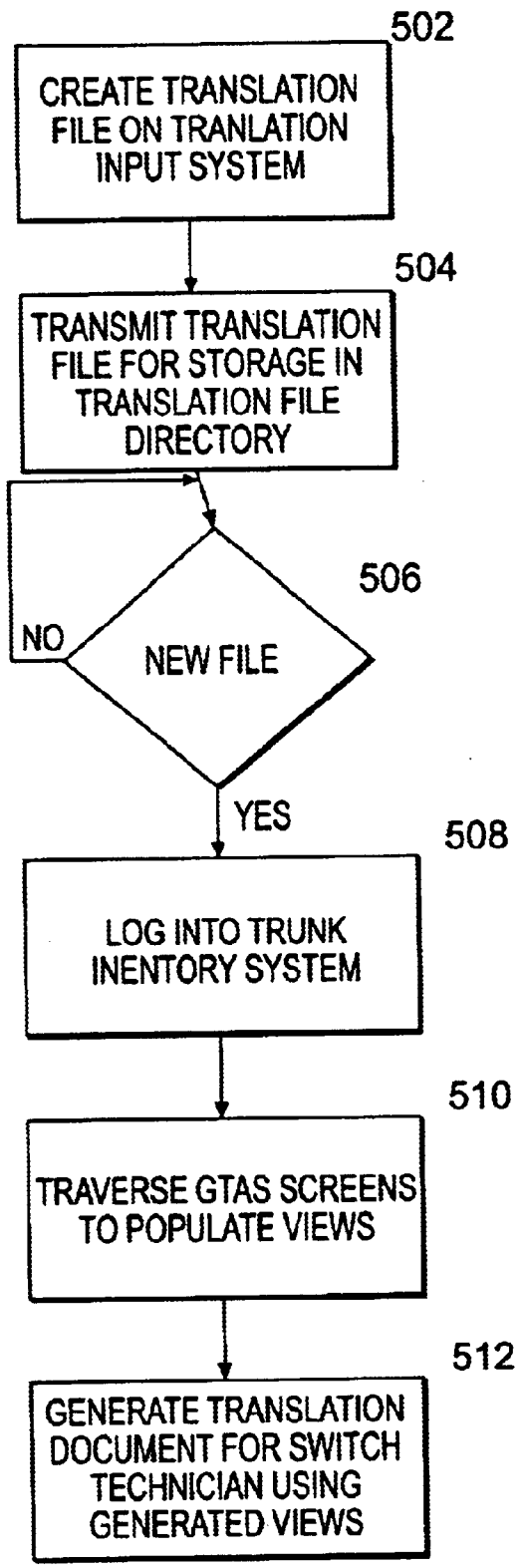
FIG. 5 is flow chart for a process according to a preferred embodiment of the present invention.

FIG. 5 is a flow chart illustrating a process 500 according to a preferred embodiment of the present invention. according to a preferred embodiment of the present invention. Process 500 begins in step 502 in which a translation file is created in response to a provisioning request on translation input system 306. In step 504, terminal emulator 309 transfers the translation file to translation file directory 307 in which the translation file is stored. A UNIX CRON process checks for the existence of a new translation file in step 506. As described above, the UNIX CRON process performs the check in step 506 at preferably 15 minute intervals. If there is no new translation file, the process keeps checking for the presence of a new translation file at preferably 15 minute intervals.

If a new translation file is found, terminal emulator 309 gets the file and logs into trunk inventory system 308 in step 508. Process 500 continues in step 510 where terminal emulator 309 traverses through several screens as described above to populate a generic view corresponding to a switch and trunk group of the type being translated. In step 512, process 500 generates a translation document that is forwarded to a switch technician to provide the require trunk group translation in the switch to support the new service.

It should be noted that while one translation file is being processed a second can be created and stored in the translation file directory. The UNIX CRON file detects the presence of the new file and signals terminal emulator 309 to process it. The UNIX CRON file can cause any files that it detects in the translation file directory to be processed in a sequential manner or simultaneously.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for automatically providing circuit provisioning request data to satisfy a customer service request, comprising:
   a translation input system to input a circuit provisioning request corresponding to a new service to be provided to a customer;
   a translation file generated on said translation input system in accordance with said circuit provisioning request;
   a trunk inventory system to provide one or more views corresponding to a switch that are completed to satisfy said circuit provisioning request; and
   an electronic interface coupling said translation input system and said trunk inventory system over which said translation file is transferred from said translation input system to said trunk inventory system that reformats the translation file in accordance with the one or more views so that the one or more views can be completed to satisfy the circuit provisioning request.

2. The system recited in claim 1, wherein said translation input system is NeTTS.

3. The system recited in claim 1, wherein said trunk inventory system is TIRKS.

4. The system recited in claim 1, further comprising a server to which said translation file is transferred, said server comprising a terminal emulator for communicating with said trunk inventory system to coordinate transfer of information contained in said file in accordance with one or more views displayed on said trunk inventory system.

5. The system recited in claim 4, wherein said server further comprises a UNIX CRON process which periodically searches for a new translation file on said server, and sends information contained in said new translation file in accordance with said one or more views.

6. The system recited in claim 1, wherein said one or more views are a generic view.

7. A method for automatically transferring translation information from a translation input system to a trunk inventory system, comprising the steps of:

(a) inputting a circuit provisioning request corresponding to new service to be provided to a customer;

(b) generating a translation file associated with said circuit provisioning request;

(c) transferring the translation file over an electronic interface coupling said translation input system and said trunk inventory system; and (d) populating a view with data from the translation file to create a translation document to be used in translating a trunk group for a switch.

8. The method recited in claim 7, further comprising the step of communicating with said trunk inventory system to send information contained in said translation file in accordance with the view displayed on said trunk inventory system.

9. The method recited in claim 8, further comprising the steps of periodically searching for said file on said server, and sending said information contained in the translation file in accordance with said views.

10. The method recited in claim 7, wherein said step of generating a view comprises the step of generating a generic view.

11. A system for providing translation information automatically, comprising:

means for inputting a circuit provisioning request corresponding to a new service to be provided to a customer;

means for generating a translation file associated with said translation request;

means for accessing one or more views corresponding to said translation file; and means for transferring the translation file electronically over an interface coupling said translation input system and said trunk inventory system to complete the accessed one or more views.

12. The system recited in claim 11, further comprising:

a server to which the translation file is transmitted;

a translation file storage area on the server in which the transmitted translation file is stored; and means for communicating with said trunk inventory system to coordinate transfer of information contained in said translation file in accordance with one or more views displayed on said trunk inventory system.

13. The system recited in claim 12, further comprising means for periodically searching for said file on said server, and sending said information contained in said file in accordance with said menu structure.

14. The system recited in claim 11, wherein said means for generating a view comprises means for generating a generic view.

15. The method of claim 7, wherein the step of populating a view comprising populating a header portion and a free-formatted portion of a generic view, said free-formatted portion being populated on a line-by-line basis using data stored in a translation file sent by said translation input system.

16. The method recited in claim 15, further comprising the step of formatting said generic view to fit on one of two, four and six pages.

17. The method recited in claim 15, further comprising the step of populating said generic view with telephone switch-specific data conforming to a translation guide.

18. The method recited in claim 15, further comprising the step of forming one or more groups of data for each line.

* * * * *